June 12, 1956  A. V. POLAK  2,750,166
MOTOR MIXER
Filed Oct. 22, 1953  2 Sheets-Sheet 1
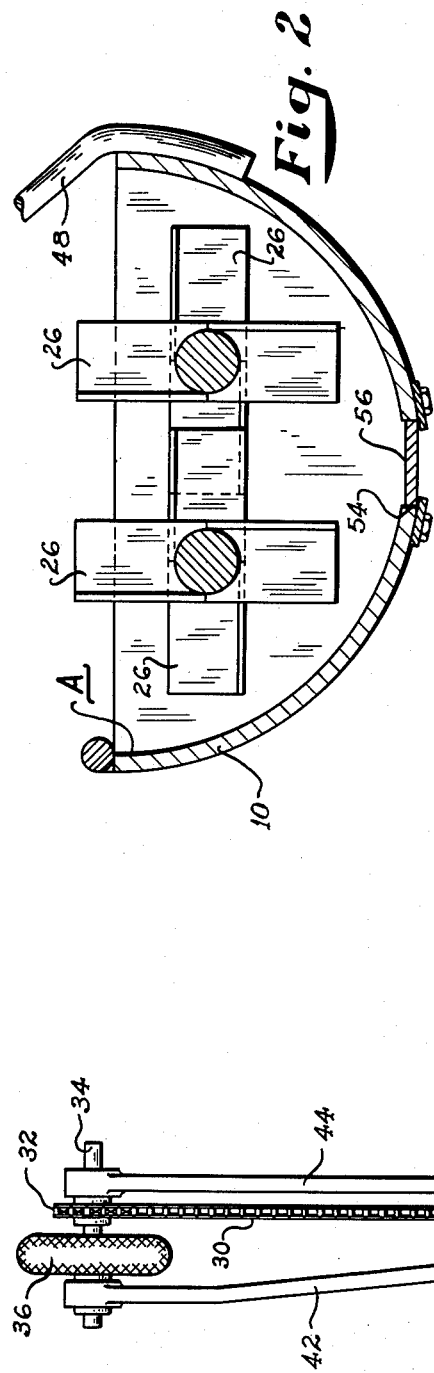
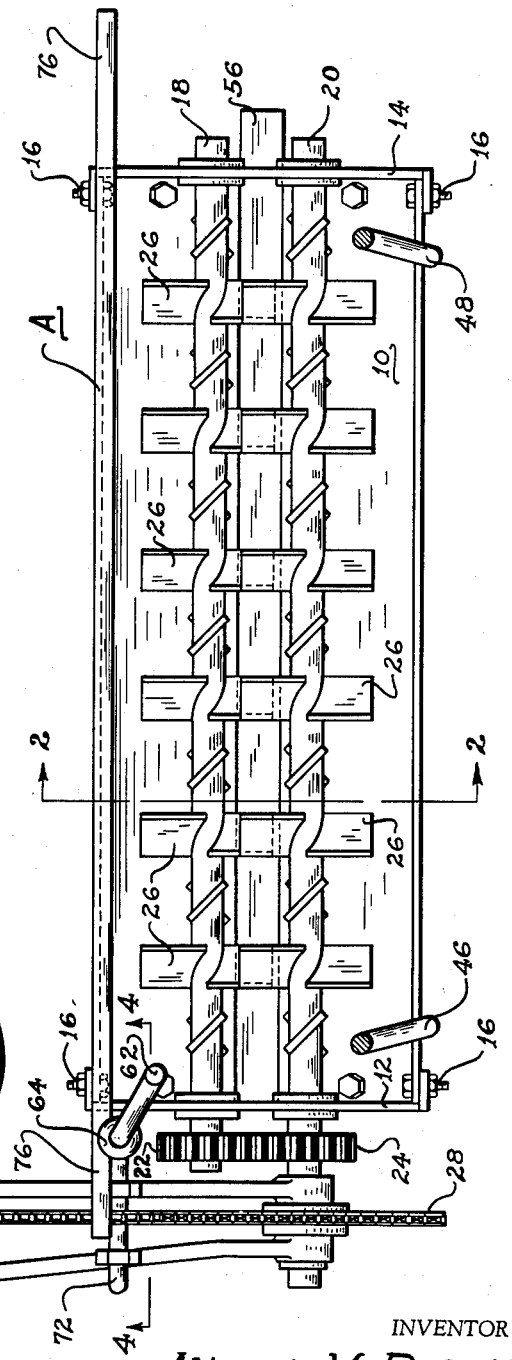
INVENTOR,
Albert V. Polak
BY Mason, Mason & Sheridan
ATTORNEYS

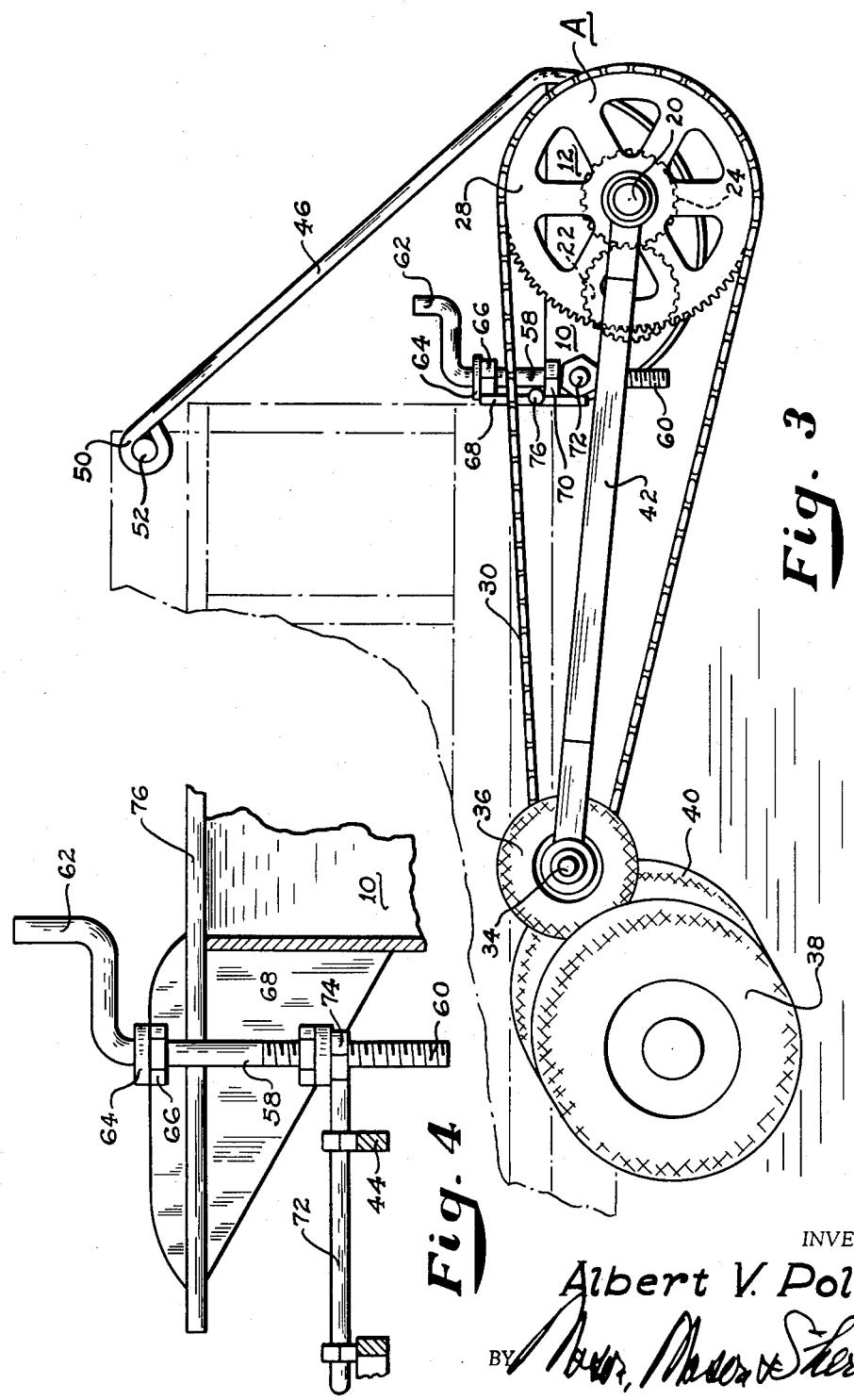

United States Patent Office 2,750,166
Patented June 12, 1956

---

2,750,166

MOTOR MIXER

Albert V. Polak, Atlanta, Ga.

Application October 22, 1953, Serial No. 387,639

15 Claims. (Cl. 259—179)

This invention relates to a device which may be attached to a truck or similar vehicle for spreading material on a surface. The invention is particularly directed to a drive for mixing and feeding materials in said device.

An object of the invention, therefore, is to provide means for supporting a mixing and spreading device such as a pug mill on a vehicle, hereinafter referred to as a truck.

Another object is to provide novel drive means for a pug mill or similar mixing device whereby the latter may be driven and supported by a truck.

An additional object is to provide a mixing device such as a pug mill having drive means which may be driven by the rear wheels of the truck.

Yet another object is to provide a mixing device which may be readily attached to or detached from the rear end of a truck.

A further object is to provide a mixing and spreading device having drive means therefor adapted to engage between a pair of the rear tires of a vehicle such as a truck.

Another object is to provide a device of the type set forth in the next penultimate paragraph wherein the driving means for the device may form one of the supporting wheels when the same is detached from the vehicle.

An additional object is the provision of means in a pug mill or other mixing device for readily adjusting the drive wheel thereof into engagement with, or in disconnecting the same with a pair of rear wheel tires of a truck.

Other objects will appear hereinafter throughout the specification.

Figure 1 is a top plan view of the device of this invention with certain parts shown in section;

Figure 2 is a vertical section taken on the line 2—2 of Figure 1;

Figure 3 is a side elevation of the device as applied to the rear end of a truck; and Figure 4 is a section taken on the line 4—4 of Figure 1.

The invention is directed particularly to the provision of a maneuverable pug mill for making a cold asphalt mixture, adapted for street repair work. The aggregate and asphalt or bitumen is mixed while the truck to which it is attached is conveyed over the surface, such as a road or street. The material may be deposited onto the road as the truck moves over the surface of the road by means of the operation of a suitable valve means hereinafter described.

Referring to the drawings, the numeral A indicates the pug mill as a whole. This consists of a receptacle 10 having detachable ends 12 and 14 that are held in position by the bolts and nuts indicated at 16.

Extending through the ends are a plurality of shafts 18 and 20 that are drivingly connected to each other by gears 22 and 24 respectively. Mounted on said shafts so as to rotate within receptacle 10 and thoroughly mix the contents thereof, are the blades 26. It will be understood that spikes (not shown) or any other mixing means may be shown in place of the blades 26, depending upon the thickness of the mixture, and the type of material to be mixed.

Gears 22 and 24 are splined on their shafts. Also splined on shaft 20 is sprocket 28. This sprocket is driven by chain 30 at one end, and whose opposite end is drivingly engaged by gear 32, which latter is splined to shaft 34. Shaft 34 supports rubber-tired wheel 36 which is also splined to the shaft, and that is adapted to engage between a pair of tires 38 and 40 which constitute one pair of the rear drive wheel tires of a truck.

The engagement of wheel 36 with the wheels 38 and 40 occurs at their peripheries, where peripheries means the surfaces of the sides as well as the tread surfaces of all of the wheels.

Shafts 20 and 34 are supported and held in proper spaced relation with each other by frame members 42 and 44 as shown in Figures 1 and 3.

Identical diagonally mounted supporting rods 46 and 48 have their lower ends connected to receptacle 10. The opposite ends of these rods are each provided with an eye 50 that is adapted to be engaged by any suitable fastening means at the rear end of the truck body, such as pins 52.

As will be noted by reference to Figures 1 and 2, receptacle 10 is provided with a slotted opening 54. This opening may be opened or closed by manually sliding the closure 56 lengthwise of the opening and of the receptacle.

Shaft 34 and wheel 36 are manually adjusted about shaft 20 as a center by the structure particularly shown in Figures 1, 3 and 4. Such structure includes a shaft 58 whose lower end is screw threaded at 60, and whose upper end is provided with a crank handle 62.

Adjacent the upper end of the shaft is a thrust bearing collar 64 that is in engagement with upper bearing 66. This latter is rigidly attached to flange 68 mounted on the receptacle. As seen in Figure 3, lower bearing 70 for the shaft 58 is also rigidly attached to flange 68.

A brace 72 is rigidly fixed to frame members 42 and 44 and extends transversely across the same as shown in Figure 1. One end 74 of the brace is provided with internal screw threads (not shown) which are engaged by the screw threaded lower end 60 of shaft 58.

In operation, the mixer or pug mill may be attached to the rear end of a truck by the eyes 50 of rods 46, and rod 76. Crank handle 62 has been previously adjusted so that during this operation, wheel 36 will be located above and completely disengaged from the pair of truck tires 38 and 40.

Crank handle 62 is next operated to cause the lowering of the wheel 36 so that it is in firm driving engagement between the pair of tires 38 and 40 of the rear dual wheels of the truck.

In the operation of the truck and motor mixer, the tail gate of the truck is removed and the motor mixer is attached by means of the eyes 50 of rods 46 and by rod 76. The ends of the rod 76 which extend laterally on both sides thereof are attached to the hooks which ordinarily would mount the tail gate of the truck.

Assuming that the truck body is filled with the sand, asphalt or other materials to be mixed, the said materials are shoveled or otherwise fed to the receptacle 10 until the receptacle is filled to the proper amount. This may be done when the truck is moving over the ground, or while it is in a stationary position.

As the truck moves over the ground, wheel 36 through chain 30 drives shafts 18 and 20 to cause the blades 26 to rotate in opposite directions, thoroughly mixing the material in the receptacle. The mixing continues until the receptacle moves over a pot-hole or other worn portion of the surface thereof where a road patch is to be made. When this location is reached, the closure 56 is slid across the slotted opening 54 to permit depositing of the mixed material on the portion of the road to be patched. This operation may occur while the truck is moving or when the same is stationary with the slot positioned over the portion of the road which requires repair. The truck is then caused to move to the next place that is in need of repair, and the operation is repeated.

In order to remove the pug mill from the truck, it is first necessary to operate the crank handle 62 to cause disengagement of the wheel 36 with the truck tires 38 and 40, after which the entire device is lifted off the truck and placed on the ground or at any other suitable place where it may be stored until it is desired to continue road repair operations. Preferably, the truck is stopped before depositing the material on the surface of the road to be patched.

It will also be understood that the material within the receptacle may be mixed while the truck is stationary. This operation may be accomplished by jacking up the tires 38 and 40 while the companion pair of rear tires (not shown) remains in contact with the ground. Upon the operation of the truck engine and the engagement of the engine clutch, the wheels 38 and 40 are driven to operate the mixer in situ. This operation may be used to create a stock pile of mixed material for future use.

The term "truck" and the term "pug mill" in the specification and claims includes any suitable type of vehicle, and any type of mixing device to be attached thereto, respectively.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A batch mixing device comprising a receptacle, mixing means located in said receptacle, means for driving said mixing means, said driving means including a driven shaft, a driving shaft, said driving shaft being pivotally connected to said driven shaft, said shafts being supported in spaced relationship, means drivingly connecting said shafts, a driving wheel mounted on said driving shaft, said driving wheel being adapted to be drivingly engaged with the rear ground-engaging driven wheel means of a vehicle, adjustable means for urging the peripheries of said driving wheel and said rear wheel means in driving engagement and means for mounting said batch mixing device on said vehicle, whereby said driving wheel may be drivingly engaged and driven by said ground-engaging driven wheel means while said vehicle is moving over the ground or while said last-named means is in a stationary jacked-up position.

2. A batch mixing device comprising a receptacle, a plurality of blades located in said receptacle, means for driving said plurality of blades, said driving means including a driven shaft, a driving shaft, said driving shaft being pivotally connected to said driven shaft, said shafts being supported in spaced relationship, means drivingly connecting said shafts, a driving wheel mounted on said driving shaft, said driving wheel being adapted to be drivingly engaged with the rear ground-engaging driven wheel means of a vehicle, adjustable means for urging the peripheries of said driving wheel and said rear wheel means in driving engagement and means for mounting said batch mixing device on said vehicle, whereby said driving wheel may be drivingly engaged and driven by said ground-engaging driven wheel means while said vehicle is moving over the ground or while said last-named means is in a stationary jacked-up position.

3. A batch mixing device comprising a receptacle, mixing means located in said receptacle, means for driving said mixing means, said driving means including a driven shaft, a driving shaft, means drivingly connecting said shafts, a driving wheel mounted on said driving shaft, said driving wheel being adapted to be drivingly engaged with the rear ground-engaging driven wheel means of a vehicle, means for detachably mounting said batch mixing device on said vehicle, adjustable means for urging the peripheries of said driving wheel and said rear wheel means in driving engagement, said last-named means including frame means, a screw threaded shaft, said frame means being mounted on said screw threaded shaft, and means mounting said shaft on said receptacle, whereby said driving wheel may be drivingly engaged and driven by said ground-engaging driven wheel means while said vehicle is moving over the ground or while said last-named means is in a stationary jacked-up position.

4. A batch mixing device comprising a receptacle, a plurality of blades located in said receptacle, means for driving said plurality of blades, said driving means including a driven shaft, a driving shaft, means drivingly connecting said shafts, a driving wheel mounted on said driving shaft, said driving wheel being adapted to be drivingly engaged with the rear ground-engaging driven wheel means of a vehicle, means for detachably mounting said batch mixing device on said vehicle, adjustable means for urging the peripheries of said driving wheel and said rear wheel means in driving engagement, said last-named means including frame means, a screw threaded shaft, said frame means being mounted on said screw threaded shaft, and means mounting said shaft on said receptacle, whereby said driving wheel may be drivingly engaged and driven by said ground-engaging driven wheel means while said vehicle is moving over the ground or while said last-named means is in a stationary jacked-up position.

5. In a batch mixing device comprising a receptacle, shaft means and mixing means thereon extending into said receptacle, means for driving said shaft means including a driven member mounted on said shaft means, and a driving member drivingly connected to said driven member, a frame connecting said members, said driving member including a shaft and a drive wheel mounted on said shaft, said drive wheel adapted to be urged between a pair of rear dual ground-engaging driven wheels of a truck whereby said driving wheel may be drivingly engaged and driven by said ground-engaging driven dual wheels while said vehicle is moving over the ground or while said dual wheels are in a stationary jacked-up position, and means for detachably mounting said device on said truck.

6. In a batch mixing device comprising a receptacle, shaft means and mixing means thereon extending into said receptacle, means for driving said shaft means including a driven member mounted on said shaft means, and a driving member drivingly connected to said driven member, a frame connecting said members, said driving member including a shaft and a drive wheel mounted on said shaft, said drive wheel having a rubber tire thereon, said drive wheel adapted to be urged between a pair of rear dual ground-engaging driven wheels of a truck whereby said driving wheel may be drivingly engaged and driven by said ground-engaging driven dual wheels while said vehicle is moving over the ground or while said dual wheels are in a stationary jacked-up position, and means for detachably mounting said device on said truck.

7. In a batch mixing device comprising a receptacle, shaft means and mixing means thereon extending into said receptacle, means for driving said shaft means including a driven member mounted on said shaft means, and a driving member drivingly connected to said driven member, a frame connecting said members, said driving member including a shaft and a drive wheel mounted on said shaft, said drive wheel adapted to be urged between a pair of rear dual ground-engaging driven wheels of a truck whereby said driving wheel may be drivingly engaged and driven by said ground-engaging driven dual wheels while said vehicle is moving over the ground or while said dual wheels are in a stationary jacked-up position, means for detachably mounting said device on said truck, and manual means for adjusting said frame and drive wheel with relation to said receptacle when said device is positioned on a truck whereby said drive wheel may be urged to engage or disengage said pair of dual wheels of said truck.

8. In a batch mixing device comprising a receptacle, shaft means and mixing means thereon extending into said receptacle, means for driving said shaft means including a driven member mounted on said shaft means, and a driving member drivingly connected to said driven member, a frame connecting said members, said driving member including a shaft and a drive wheel mounted on said shaft, said drive wheel having a rubber tire thereon, said drive wheel adapted to be urged between a pair of rear dual ground-engaging driven wheels of a truck whereby said driving wheel may be drivingly engaged and driven by said ground-engaging driven dual wheels while said vehicle is moving over the ground or while said dual wheels are in a stationary jacked-up position, means for detachably mounting said device on said truck, and manual means for adjusting said frame and drive wheel with relation to said receptacle when said device is positioned on a truck whereby said drive wheel may be urged to engage or disengage said pair of dual wheels of said truck.

9. In a batch mixing device comprising a receptacle, shaft means and mixing means thereon extending into said receptacle, means for driving said shaft means including a driven member mounted on said shaft means, and a driving member drivingly connected to said driven member, a frame connecting said members, said driving member including a shaft and a drive wheel mounted on said shaft, said drive wheel adapted to be urged between a pair of rear dual ground-engaging driven wheels of a truck whereby said driving wheel may be drivingly engaged and driven by said ground-engaging driven dual wheels while said vehicle is moving over the ground or while said dual wheels are in a stationary jacked-up position, means for detachably mounting said device on said truck, and manual means for adjusting said frame and drive wheel with relation to said receptacle when said device is positioned on a truck whereby said drive wheel may be urged to engage or disengage said pair of dual wheels of said truck, said receptacle having an opening and a manually operated closure for said opening.

10. In a batch mixing device comprising a receptacle, shaft means and mixing means thereon extending into said receptacle, means for driving said shaft means including a driven member mounted on said shaft means, and a driving member drivingly connected to said driven member, a frame connecting said members, said driving member including a shaft and a drive wheel mounted on said shaft, said drive wheel having a rubber tire thereon, said drive wheel adapted to be urged between a pair of rear dual ground-engaging driven wheels of a truck whereby said driving wheel may be drivingly engaged and driven by said ground-engaging driven dual wheels while said vehicle is moving over the ground or while said dual wheels are in a stationary jacked-up position, means for detachably mounting said device on said truck, and manual means for adjusting said frame and drive wheel with relation to said receptacle when said device is positioned on a truck whereby said drive wheel may be urged to engage or disengage said pair of dual wheels of said truck, said receptacle having an opening and a manually operated closure for said opening.

11. A pug mill attachment for a truck comprising a receptacle and frame means, shafts extending through said receptacle, mixing blades on said shafts, gear means connecting said shafts to each other, a drive shaft mounted at one end of said frame means, one of said receptacle shafts being mounted in the opposite end of said frame means, a drive wheel mounted on said drive shaft, chain means connecting said shafts mounted in said frame means, said drive wheel adapted to be urged between a pair of tires of one of the dual ground-engaging driven wheels of a truck whereby said driving wheel may be drivingly engaged and driven by said ground-engaging driven dual wheels while said vehicle is moving over the ground or while said dual wheels are in a stationary jacked-up position, means detachably mounting said pug mill on the rear end of said truck, and means for adjusting said drive wheel with relation to said pair of tires while said pug mill is in position on said truck, whereby to engage or disengage said pair of tires with said drive wheel.

12. A pug mill attachment for a truck comprising a receptacle and frame means, shafts extending through said receptacle, mixing blades on said shafts, gear means connecting said shafts to each other, a drive shaft mounted at one end of said frame means, one of said receptacle shafts being mounted in the opposite end of said frame means, a drive wheel mounted on said drive shaft, said drive wheel having a tire of rubber-like material mounted thereon, chain means connecting said shafts mounted in said frame means, said drive wheel adapted to be urged between a pair of tires of one of the dual ground-engaging driven wheels of a truck whereby said driving wheel may be drivingly engaged and driven by said ground-engaging driven dual wheels while said vehicle is moving over the ground or while said dual wheels are in a stationary jacked-up position, means detachably mounting said pug mill on the rear end of said truck, and means for adjusting said drive wheel with relation to said pair of tires while said pug mill is in position on said truck, whereby to engage or disengage said pair of tires with said drive wheel.

13. A pug mill attachment for a truck comprising a receptacle and frame means, shafts extending through said receptacle, mixing blades on said shafts, gear means connecting said shafts to each other, a drive shaft mounted at one end of said frame means, one of said receptacle shafts being mounted in the opposite end of said frame means, a drive wheel mounted on said drive shaft, chain means connecting said shafts mounted in said frame means, said drive wheel adapted to be positioned between a pair of tires of one of the dual ground-engaging driven wheels of a truck whereby said driving wheel may be drivingly engaged and driven by said ground-engaging driven dual wheels while said vehicle is moving over the ground or while said dual wheels are in a stationary jacked-up position, means for detachably mounting said pug mill on the rear end of said truck, and means for adjusting said drive wheel with relation to said pair of tires while said pug mill is in position on said truck, whereby to engage or disengage said pair of tires with said drive wheel, said means for adjusting said drive wheel with regard to said tires including a shaft mounted on said receptacle and engaging said frame means, said shaft having a screw threaded engagement with said frame means adjacent one end thereof and a handle adjacent the other end thereof.

14. A pug mill attachment for a truck comprising a receptacle and frame means, shafts extending through said receptacle, mixing blades on said shafts, gear means connecting said shafts to each other, a drive shaft mounted at one end of said frame means, one of said receptacle shafts being mounted in the opposite end of said frame means, a drive wheel mounted on said drive shaft, said drive wheel having a tire of rubber-like material mounted thereon, chain means connecting said shafts mounted in said frame means, said drive wheel adapted to be positioned between a pair of tires of one of the dual ground-engaging driven wheels of a truck whereby said driving wheel may be drivingly engaged and driven by said ground-engaging driven dual wheels while said vehicle is moving over the ground or while said dual wheels are in a stationary jacked-up position, means detachably mounting said pug mill on the rear end of said truck, and means for adjusting said drive wheel with relation to said pair of tires while said pug mill is in position on said truck, whereby to engage or disengage said pair of tires with said drive wheel, said means for adjusting said drive wheel with regard to said tires including a shaft mounted on said receptacle and engaging said frame means, said shaft having a screw threaded engagement with said frame means adjacent one end thereof and a handle adjacent the other end thereof.

15. A combined conveying and mixing means comprising a truck having an open rear end, pin means adjacent the upper rear end of said truck, eye means adjacent the lower rear end of said truck, said truck having a pair of rear dual ground-engaging driven wheels and tires thereon adjacent each rear side thereof, the combination with said truck of: a batch mixing device comprising a receptacle, a plurality of blades located in said receptacle, means for driving said plurality of blades, said driving means including a driven shaft, a driving shaft, means drivingly connecting said shafts, a driving wheel mounted on said shaft, said driving wheel being adapted to be drivingly engaged with the pairs of tires of the said dual wheels, and means for mounting said batch mixing device on the said pin means and eye means on said truck whereby said driving wheel may be drivingly engaged and driven by said ground-engaging driven dual wheels while said vehicle is moving over the ground or while said dual wheels are in a stationary jacked-up position.

References Cited in the file of this patent

UNITED STATES PATENTS

| | | |
|---|---|---|
| 845,942 | Gentzler | Mar. 5, 1907 |
| 1,727,992 | King | Sept. 10, 1929 |
| 2,142,588 | Medley et al. | Jan. 3, 1939 |
| 2,492,895 | Schutz | Dec. 27, 1949 |
| 2,507,077 | Williams | May 9, 1950 |
| 2,520,033 | Fuelling | Aug. 22, 1950 |
| 2,588,178 | Thompson | Mar. 4, 1952 |